United States Patent [19]

Bireley

[11] Patent Number: 5,546,974
[45] Date of Patent: Aug. 20, 1996

[54] MOISTURE MONITORING SYSTEM

[76] Inventor: Richard L. Bireley, 6951 Southgate Dr., San Diego, Calif. 92116

[21] Appl. No.: 367,739

[22] Filed: Jan. 3, 1995

[51] Int. Cl.$^6$ .................................................. A01G 25/16
[52] U.S. Cl. .................. 137/78.3; 137/624.12; 239/64; 239/69
[58] Field of Search .......................... 137/78.3, 624.11, 137/624.12; 239/64, 69, 70

[56] References Cited

U.S. PATENT DOCUMENTS

| | | | |
|---|---|---|---|
| 4,850,386 | 7/1989 | Bireley | 137/78.3 |
| 4,875,497 | 10/1989 | Worthington | 137/2 |
| 4,936,333 | 6/1990 | Bireley | 137/78.3 |

*Primary Examiner*—A. Michael Chambers
*Attorney, Agent, or Firm*—Brown, Martin, Haller & McClain

[57] ABSTRACT

A capacitive moisture sensor has two conductors encased in a dielectric material and oriented to minimize the dielectric effect of the moisture-absorbent medium in which the sensor is placed. The conductors, the casing, or both have one or more physical dimensions that vary monotonically across the length of the sensor. The physical dimensions vary in a manner that produces a linear relationship between moisture level and sensor impedance. The physical dimension may be the thickness of the dielectric casing or the spacing between portions of the conductors. In another aspect, the present invention has an irrigation control system with a central control unit and multiple remote units. Each remote unit has a moisture sensor and transmits a measured moisture level to the central control unit. In response to the measured moisture level, the central control unit determines whether to open or close a valve controlling the irrigation of the area in which the sensor is located.

44 Claims, 3 Drawing Sheets

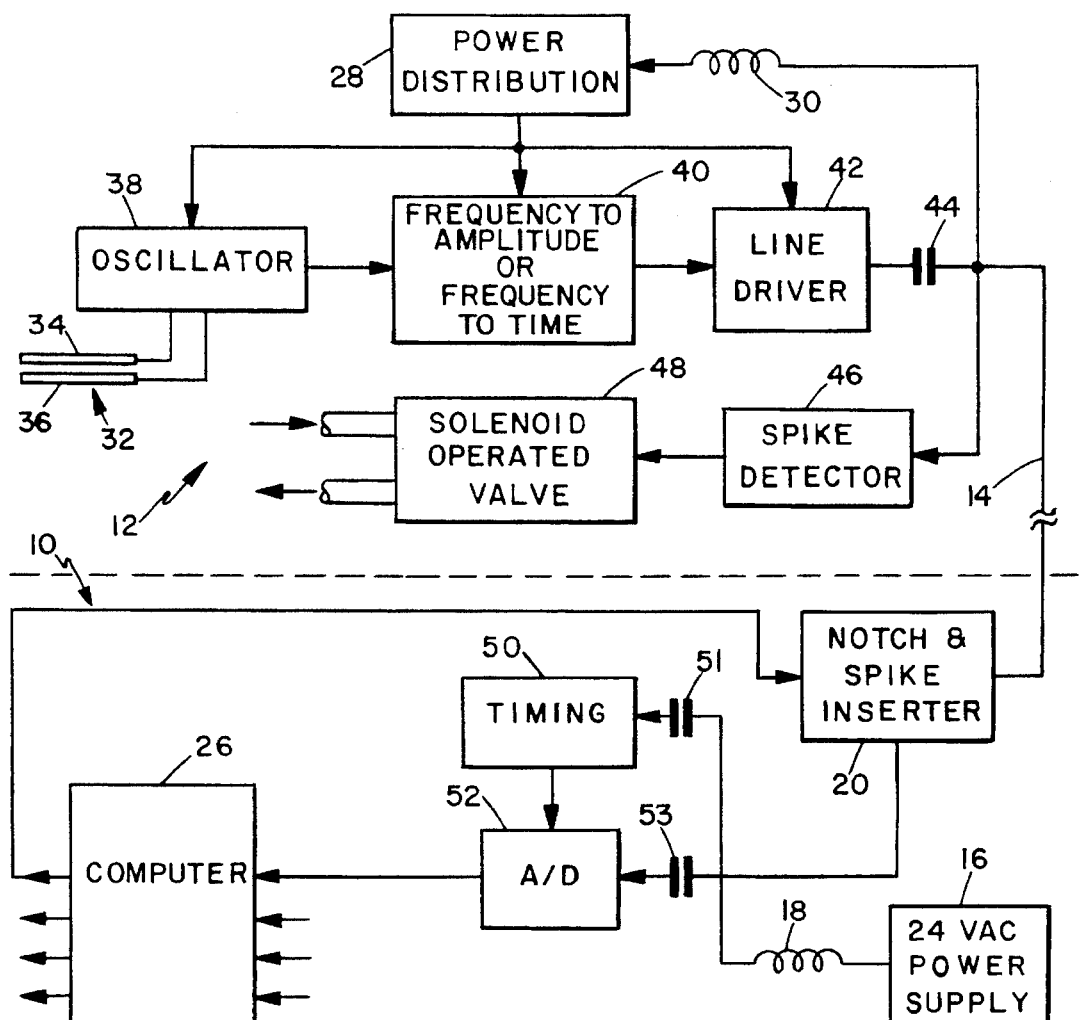
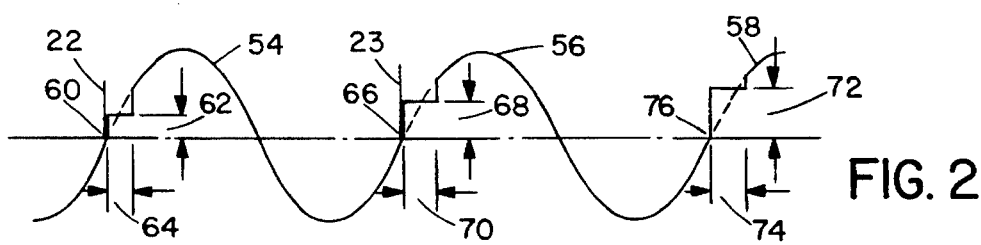
FIG. 2
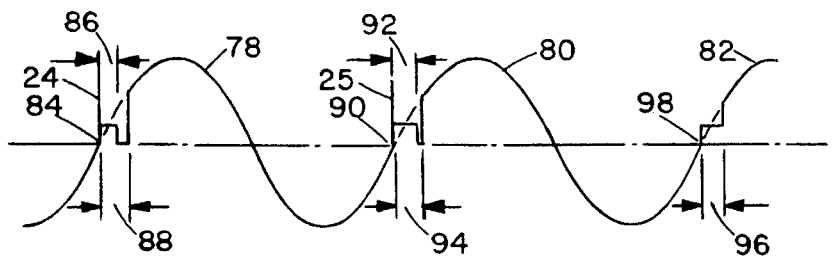
FIG. 3

MOISTURE MONITORING SYSTEM

BACKGROUND OF THE INVENTION

1. Field of the Invention

The present invention relates to systems for measuring moisture and, more specifically, to a capacitive moisture sensor that provides a highly linear output throughout a large range of moisture levels, and to a system for controlling multiple moisture sensors from a central location.

2. Description of the Background

Moisture measuring systems are typically used for monitoring irrigated land and for controlling irrigation equipment. Such systems have long used a capacitive sensor comprising two parallel plate electrodes that are embedded in the soil, which functions as a dielectric. The capacitance defined by the electrodes and intervening soil varies with the dielectric constant of the soil, which in turn varies with the moisture level of the soil. The system can thus measure the capacitance and convert the measured value into a measure of moisture level in the soil. However, the presence of salts and other impurities in the soil can substantially impair measurement accuracy in such a system because impurities alter the dielectric constant; the presence of salts will produce the same effective capacitance as a larger volume of water.

U.S. Pat. No. 4,850,386, issued on Jul. 25, 1989 to the inventor of the present invention and incorporated herein by reference, discloses a sensor that minimizes the effects of impurities. Plate electrodes are disposed in a side-by-side, i.e., coplanar, arrangement. One or both electrodes are covered with a dielectric casing or coating. When the sensor is embedded in soil, traces or paths of water will form between points on the dielectric casing above each electrode. Each path forms a point capacitor between the impinging moisture drop and the conductive electrode surface. The total capacitance of the sensor equals the sum of the point capacitances over the surface area of the electrodes because the point capacitors are effectively in parallel. Due to the thickness of the dielectric casing and the very small surface area of the droplet, the resulting capacitor has a much greater impedance than the soil along the same path, thus swamping the effect of impurities in the soil. As the number of such paths increases, the impedance between the electrodes changes as a function of moisture level in a relatively consistent and definite manner regardless of the presence or amount of soil impurities. In fact, the function relating sensor impedance to moisture level is not only definite, but it is also essentially linear over a range of moisture levels.

The range of moisture levels over which moisture level is directly proportional to sensor impedance is quite limited, however. As moisture levels increase, the electrodes become increasingly saturated with moisture traces, and the relationship between moisture level and sensor impedance becomes increasingly non-linear, saturating the sensor at a very low moisture level. This non-linearity produces inaccurate moisture level measurements. Additionally, each moisture trace has a resistance in addition to a capacitance; the measuring circuit thus oscillates in response to a complex impedance. The ratio of the resistance portion of the impedance to the capacitance portion of the impedance increases with increasing moisture levels. A sensor that exhibits a highly linear relationship between impedance and moisture level over a wide range of moisture levels would thus be desirable.

Moisture measuring systems may also control irrigation equipment. The above-cited U.S. Patent discloses a module having a moisture sensor circuit and a circuit that opens a valve when the measured moisture level drops below a predetermined level and closes it when the moisture level has returned to the same predetermined level.

Irrigated tracts such as lawns and golf courses may have many regions, each irrigated by a sprinkler or group of sprinklers. The irrigation of each region is controlled by a separate module. Practitioners in the art have improved the control systems of such modules by using microprocessors or microcontrollers executing algorithms that calculate optimal watering intervals. Although such systems are flexible and can easily be re-programmed to meet the individual requirements of each region, frequent re-programming of numerous modules located over a large irrigated area is required and must be changed as weather conditions vary.

Practitioners in the art have controlled irrigation valves from a centralized location or hub by modulating the voltage on the power line between the hub and the remote modules. Controlling the valves in this manner is advantageous because existing irrigation equipment installed in many golf courses and other irrigated tracts is connected to a 24 volt AC power line, which is a widely used standard. This modulation enables the centralized controller to remotely open and close the valves in response to a timer or a manual control switch, but the centralized controller does not receive any moisture level information.

A moisture monitoring and control system that has modules that transmit moisture level measurements to a centralized controller, which in turn remotely controls individual irrigation valves in response to these measurements, would be highly desirable.

There are also applications for moisture monitoring devices in moisture-containing media other than soils. For instance, the curing of concrete is a function of the change in moisture content of the concrete mixture. Similarly, the potential for failure of earthen dams is a function of the amount of water seepage within the dam structure. The presence and/or movement of toxic liquids in soil can be determined by measurement of water displacement by such liquids. All of these applications, and others of similar nature, some of which are mentioned below, could benefit from monitoring by use of moisture detection devices.

These problems, needs and deficiencies are clearly felt in the art and are solved by the present invention in the manner described below.

SUMMARY OF THE INVENTION

The present invention comprises a moisture sensor that exhibits a linear relationship between impedance and moisture level over a wide range of moisture levels. The sensor comprises two electrodes or conductors oriented to minimize the dielectric effect of the moisture-absorbent medium in which the sensor is placed. When placed in the medium, moisture traces create point capacitors between the plates. The total capacitance of the sensor equals the sum of the point capacitances. A suitable circuit may convert the total capacitance to a moisture level measurement. The conductors are encased in a casing made of a dielectric material.

An important feature of the present invention is that the conductors, the casing, or both have one or more physical dimensions that vary across the length of the sensor. When exposed to moisture, the variation in the physical dimension enables the formation of multiple moisture traces of different lengths between the conductors. Although increased moisture levels may saturate portions of the conductors that can be bridged by shorter traces, the total capacitance remains responsive to increasing moisture levels until the portions of the conductors that can only be bridged by long traces become saturated. The physical dimensions should vary in a manner that produces a linear relationship between moisture level and sensor impedance.

In an exemplary embodiment, the conductors are plate-shaped, and the physical dimension that varies is the thickness of the dielectric casing. In another exemplary embodiment, the conductors are comb-shaped and are oriented with the fingers of one comb interlocking with those of the other. The physical dimension that varies is the spacing between the parallel interlocking fingers. In yet another embodiment the conductors on one electrode are comb-shaped and the other electrode is a solid bar. In yet other embodiments, both the finger spacing and the dielectric casing thickness may vary.

The conductors may be flat and oriented in the same plane. The thickness of the conductors is not critical, but the thickness is small enough relative to their length or width that the conductors have a substantially planar shape.

Due to the laterally symmetrical fabrication of the sensor element, it is not affected by its physical orientation in the medium. It is thus unlike prior art devices, which due to proximity to the surface of the soil and the source of impinging moisture, required a specific orientation to avoid inconsistent readings between sensors.

In another aspect, the present invention comprises a central control unit and a plurality of remote units, and is used to control application of water to a medium, such as irrigated soil, in which the moisture content has become depleted. Each remote unit has a sensor and measures the moisture level in the vicinity of a corresponding irrigation region. Each remote unit transmits the measured moisture level to the central control. In response to the measured moisture level, the central control unit determines whether to open or close the valve controlling the irrigation of that region. The central control unit then produces a valve control signal and transmits this signal to the remote unit via the power line. The remote unit receives the valve control signal and in response opens or closes the valve.

The word "irrigation" is not intended to limit the present invention to agricultural uses, but is intended to include humidification and other uses involving the addition or measurement of moisture. Although the present invention may be used for measuring and controlling soil irrigation by embedding sensors in soil or a similar agricultural medium, it may also be used for measuring and controlling the moisture level in other environments by embedding sensors in other suitable media. For example, sensors may monitor the drying of concrete by embedding them in the still-wet concrete. Sensors may also monitor humidity levels by utilizing a thin layer of moisture absorbent material covering the sensor. The sensor then responds to the moisture content of the absorbent layer, which is, in turn, the same as that of the surrounding air. For example, sensors may monitor the humidity level in grain storage silos and other enclosures in which humidity control is critical. The sensors can also be used to measure water level in a body of water, such as a swimming pool, monitor the moisture content of an earthen dam and thus indicate the potential for failure of the dam, and detect the presence and/or movement of toxic liquids (such as petroleum products) in soil by measurement of normal soil water displacement by such liquids.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 is a schematic block diagram of a typical moisture measuring and irrigation control system;

FIG. 2 is a time/amplitude plot of a power signal waveform modulated with a moisture level measurement and a valve control signal;

FIG. 3 is similar to FIG. 2, and shows an alternate method of modulating the power signal;

DETAILED DESCRIPTION AND PREFERRED EMBODIMENT

Figure 4:
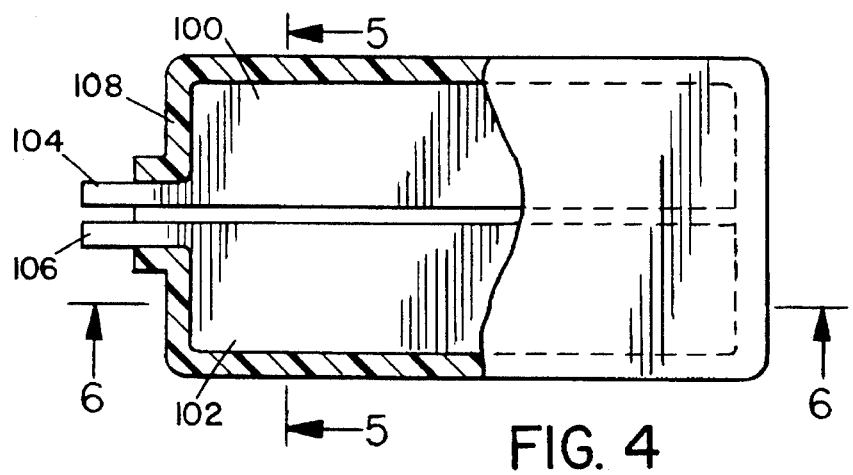
FIG. 4 illustrates a sensor having parallel plate electrodes and a dielectric casing of a thickness that varies across the electrodes.

As illustrated in FIG. 1, a circuit for monitoring soil moisture comprises a central unit 10 and a remote unit 12. Remote unit 12 is preferably disposed near an irrigated region, and may be substituted for an existing irrigation valve controller known in the art. As discussed below, a plurality of such remote units 12 may be used to irrigate a plurality of such regions. Remote unit 10 is preferably disposed at a convenient location near a source of 24 volt alternating current (VAC) power that may presently exist for powering irrigation valve controllers. Although a 24 VAC system is described herein, any voltage suitable for powering remote units 12 that can be conveniently distributed to remote units 12 may be used.

A power distribution line 14 connects central unit 10 and remote unit 12 and carries a signal such as that shown in FIG. 2 or FIG. 3, as explained in further detail below. Central unit 10 has a power supply 16 that provides a 24 VAC (sinewave) power signal at a convenient frequency, such as the 60 Hertz (Hz) provided by the local power utility. An inductor 18 blocks high frequencies, i.e., those above approximately 1 kHz, preventing power supply 16 from presenting an excessive load to the superimposed signal level. Although an inductor is shown for simplicity, other passive or active circuitry that performs a similar filtering function is also suitable.

Central unit 10 has a modulator circuit 20 that modulates the first approximately 100 microseconds (μs) of the power signal, which is represented in FIGS. 2 and 3 by the portion of each waveform in broken line following each zero-crossing. This portion of the power signal is preferably modulated by reducing the voltage to zero, thereby forming a notch in the waveform having a predetermined length of 100 μs. This notched portion of the power signal is also modulated with a valve control signal, which is represented in FIGS. 2 and 3 by voltage spikes 22–25. A computer 26 generates the valve control signal in response to a moisture measurement received from remote unit 12, as discussed below. Each of spikes 22–25 are located at a zero-crossing point of the respective waveform. Remote unit 12 turns on irrigation equipment in response to the presence of the valve control signal and turns off the irrigation equipment in response to the absence of the valve control signal. This operation provides a "fail-safe" operation in which failure of control unit 10 will leave the irrigation water turned off, thus preventing flooding of the area.

Remote unit 12 has a power distribution circuit 28 that receives the power signal transmitted on power distribution line 14. Power distribution circuit 28 distributes electrical power to any electronic components of remote unit 12 that require electrical power. Power distribution circuit 28 may rectify the power or convert it to other voltages, as required by the electronic components of remote unit 12. An inductor 30 blocks high frequencies, i.e., those above approximately 1 kHz. This prevents excessive loading of the incoming signal. Although an inductor is shown for simplicity, other passive or active circuitry that performs a similar filtering function is also suitable.

Remote unit 12 has a sensor 32, which comprises two electrodes 34 and 36. An oscillator 38 applies an alternating current to electrodes 34 and 36, which are disposed in the soil in a manner that exhibits a capacitance. The circuit formed by oscillator 38 and electrodes 34 and 36 oscillates at a frequency proportional to this capacitance. As explained below, the capacitance, and thus the oscillation frequency, is proportional to the soil moisture level.

As explained herein, the invention provides means by which a linear response to moisture contained in the surrounding medium is obtained. However, so that the circuit response is not dependent upon the changing characteristics of a capacitor which is approximately linear during its initial charge interval, but which becomes increasingly non-linear as the charge approaches maximum, the system includes a constant current source 39 to the oscillator 38, resulting in linear charge characteristics throughout the entire range. This in turn produces a frequency that is proportional to the sensor input throughout its entire range. The resulting combination of linearized and extended range sensor and linearized circuit response produces a highly accurate representation of moisture content.

Remote unit 12 has a frequency-to-amplitude converter 40 that samples the oscillation frequency following each zero-crossing of the power signal and converts the oscillation frequency into a moisture measurement signal having an amplitude proportional to the oscillation frequency and thus proportional to the soil moisture level. A line driver imposes the moisture measurement signal on the power signal during the notch portion that follows each zero-crossing. Thus, each cycle of the power signal is modulated with the moisture level signal and may also be modulated with the valve control signal. A capacitor 44 blocks low frequencies, i.e., those below approximately 1 kHz, and couples the line driver output to the power line. Although a capacitor is shown for simplicity, other passive or active circuitry that performs a similar filtering function is also suitable.

Remote unit 12 has a spike detector 46 that receives the power signal and detects the presence or absence of a voltage spike following each zero-crossing. When spike detector 46 does not detect a voltage spike it maintains an electromechanical valve 48 in the closed position, thereby preventing water from reaching the sprinkler or sprinklers (not shown). When spike detector 46 detects a spike it opens electromechanical valve 48, thereby allowing the water supply to reach the sprinklers. In the event of circuit failure, valves may be operated manually.

Central unit 10 has a timing circuit 50 that detects each zero-crossing and triggers an analog-to-digital (A/D) converter 52 to measure the amplitude of the power signal immediately following the zero-crossing. As discussed above, the amplitude of the modulated notch region of the power signal represents the soil moisture level. Computer 26 receives the output of A/D converter 52, which is the moisture measurement signal extracted from the power signal. In response to the extracted moisture measurement signal, computer 26, using a suitable algorithm, determines whether to produce a valve control signal. The algorithm preferably has a lower threshold and an upper threshold. When the moisture measurement is less than the lower threshold, computer 26 produces a valve control signal to begin irrigation. When the moisture measurement is greater than the upper threshold, computer 26 does not produce a valve control signal, thereby ceasing or preventing irrigation. Other more complex algorithms may be used, and may include additional inputs such as time of day and season. The algorithm may be adapted to optimize irrigation of each region in a system having multiple remote units 12. The additional inputs and outputs to computer 26 are used in a system having multiple remote units 12 to connect additional circuitry of the above-described type. Computer 26 would sequentially sample each moisture measurement signal and sequentially produce a corresponding valve control signal.

Capacitors 51 and 53 couple the incoming signal to the timing circuit while blocking the low frequency power signal, allowing free operation of timing circuit 50 and A/D converter 52, respectively. Although capacitors are shown for simplicity, other passive or active circuitry that performs a similar filtering function is also suitable.

The operation of the above-described system is illustrated in FIG. 2, which shows portions of three successive cycles 54, 56, and 58 of the modulated power signal. Cycle 54 has a voltage spike 22 at the zero-crossing 60. Thus, remote unit 12 maintains valve 48 in an open position to irrigate the soil. The moisture level is represented by the notched portion amplitude 62, which remains constant over the entire length of the notched portion 64. Similarly, cycle 56 has a voltage spike 23 following the zero-crossing 66, and remote unit 12 continues irrigation. The moisture level is represented by the notched portion amplitude 68, which remains constant over notched portion 70. However, amplitude 68 is greater than amplitude 62, indicating that the soil moisture level has increased between the time that cycle 54 occurred and cycle 56 occurred. (FIGS. 2–3 are not to scale, and the change in moisture level between successive cycles shown in FIGS.

2–3 may appear somewhat exaggerated for the purpose of clarity.) By the time cycle 58 occurs, the moisture level has increased to that represented by amplitude 72, which remains constant over notched portion 74. In response to the increased moisture level represented by amplitude 68 of the previous cycle 56, in cycle 58 computer 26 removes the valve control signal represented by the voltage spikes. Remote unit 12 should then close valve 48 in response to the absence of a voltage spike at zero-crossing 76, as discussed above. In further cycles (not shown), the amplitudes of the notched portions should begin to decrease as the moisture level of the soil decreases in response to a gradual loss of moisture from the soil in the absence of irrigation.

An alternate modulation method for modulating the power signal is illustrated in FIG. 2 by three successive cycles 78, 80, and 82. In this method, the moisture level is represented in each cycle by the length of a pulse that occurs in the notched portion. Practitioners in the art can readily convert the pulse width circuitry shown in FIG. 1 to form a train of pulses, the number of which is determined by the length of the pulse from the remote units and to interpret such pulses in the central unit.

Cycle 78 has a voltage spike 24 at the zero-crossing 84. Thus, remote unit 12 maintains valve 48 in an open position to irrigate the soil. The moisture level is represented by the notched portion pulse length 86, which occurs at the beginning of the notched portion 88. Similarly, cycle 80 has a voltage spike 25 at the zero-crossing 90, and remote unit 12 continues irrigation. The moisture level is represented by the notched portion pulse length 92, which remains constant over notched portion 94. Pulse length 92 is greater than pulse length 86, indicating that the soil moisture level has increased between the time that cycle 78 occurred and cycle 80 occurred. By the time cycle 82 occurs, the moisture level has increased to that represented by the notched portion pulse length 96. In response to the increased moisture level represented by notched portion pulse length 92 of the previous cycle 80, in cycles 82 computer 26 removes the valve control signal represented by the voltage spikes. Remote unit 12 should then close valve 48 in response to the absence of a spike at zero-crossing 98, as discussed above. In further cycles (not shown), the lengths of the pulses in the notched portions should begin to decrease as the moisture level of the soil decreases in response to a gradual loss of moisture from the soil in the absence of irrigation.

The above-described methods for modulating the power signal are only illustrative, and other schemes may also be suitable. For example, in methods similar to that shown in FIG. 3, the pulse representative of the moisture level may occur at the end of the notched portion, or the pulse length may be inversely proportional to the moisture level. In methods similar to that shown in FIG. 2, the amplitude of the pulse may extend over less than the full length of the notched portion, or the amplitude of the pulse may be inversely proportional to soil moisture level. Furthermore, the modulated portion need not be notch-shaped and need not be located immediately following a zero-crossing; it may immediately precede a zero-crossing and may even be located entirely within the positive or negative portion of the power signal waveform. In addition, the valve control signal need not be represented by a voltage spike, which is a very short pulse. A longer pulse or combination of pulses may be used.

Figure 5:
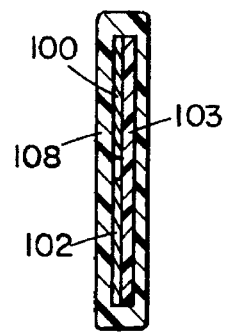
FIG. 5 is a sectional view of a sensor taken along line 5—5 of FIG. 4.
Figure 6:
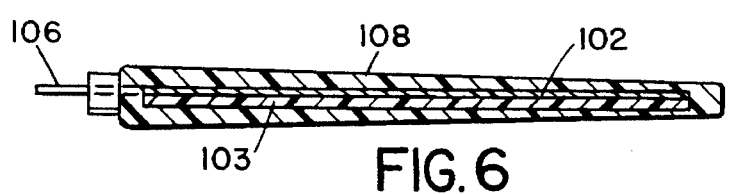
FIG. 6 is a sectional view of a sensor taken along line 6—6 of FIG. 4.

An improved sensor for use with remote unit 12 or other capacitive moisture measuring systems is illustrated in FIGS. 4–6. The sensor comprises two conductive plates 100 and 102. Although plates 100 and 102 may be formed in any suitable manner, they may easily be formed by etching portions of the metal layer of blank printed-circuit (PC) board material, leaving the dielectric substrate 103 where the metal has been etched away.

Plates 100 and 102 are coplanar with one another and not in electrical contact with one another. Plate 100 has a terminal 104, and plate 102 has a terminal 106 for connecting the sensor to a suitable moisture measuring device such as remote unit 12. All of plates 100 and 102 except terminals 104 and 16 are embedded in a suitable dielectric casing 108, such as MYLAR® or a similar dielectric material. Casing 108 has a thickness that changes monotonically across at least the portion of it that covers plates 100 and 102. This important aspect of the present invention causes the capacitance between the impinging moisture drop and the sensor plate to vary inversely to the thickness of the casing. The resulting higher impedance seen in regions of greater casing thickness requires higher moisture levels to effect a measurable change in capacitance. Although increased moisture levels may saturate portions of plates 100 and 102 that are separated from each other by thinner portions of casing 108, the total capacitance remains responsive to increasing moisture levels until the portions of plates 100 and 102 that are separated by thicker portions of casing 108 become saturated.

The thickness of casing 108 changes in a manner that maximizes the linearity of the relationship between moisture level and sensor impedance. The optimal change in thickness per unit length of casing 108 depends on the particulate size and density of the medium in which the sensor measures moisture. A natural logarithmic (base e) taper is preferred for a sensor to be used in a medium having a ratio of solids to air space of approximately 50%. In other words, the thickness increases by a factor of approximately 2.87 for each unit increase in length of casing 108. (The taper shown in FIGS. 4–6 is not to scale for the purpose of clarity.) In general, a greater taper is preferred for media having a relatively high particulate density than is preferred for media having a relatively low particulate density. For example, the thickness of casing 108 of a sensor used for measuring the moisture level in fine particulate matter such as clay should preferably have a larger taper than a sensor used for measuring the moisture level in coarse granular media such as gravel. The thickness of casing 108 of a sensor used for measuring the moisture level in air (a medium having essentially no particulate matter) will not change across its length.

Figure 7:
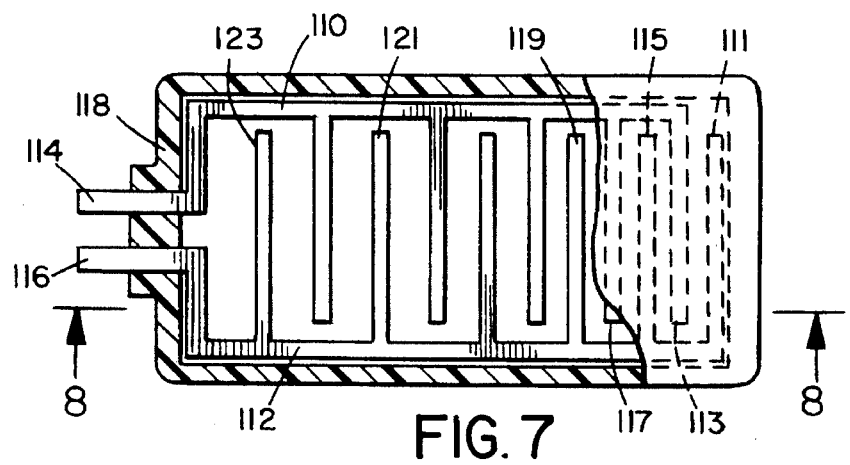
FIG. 7 illustrates a sensor having interleaved comb electrodes and a dielectric casing.
Figure 8:
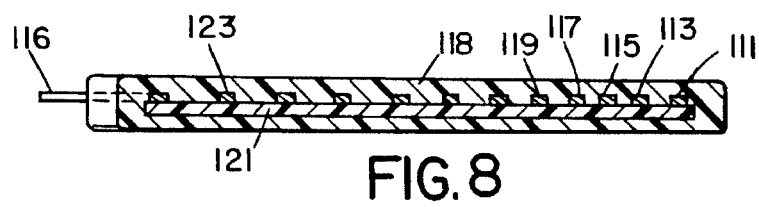
FIG. 8 is a sectional view of a sensor having interleaved comb electrodes and a dielectric casing of uniform thickness taken along line 8—8 of FIG. 7.

An alternate embodiment of the improved sensor of the present invention is shown in FIGS. 7 and 8. The sensor comprises two conductive combs 110 and 112 that have multiple parallel teeth. Comb 110 and 112 may be formed in any suitable manner, such as etching the metal layer from a PC board blank, leaving the dielectric substrate 121 where the metal has been etched away. Comb 110 has a terminal 114, and comb 112 has a terminal 116 for connecting the sensor to a soil moisture measuring device such as remote unit 12. All of combs 110 and 112 except terminals 114 and 116 are embedded in a suitable dielectric casing 118, such as MYLAR® or a similar dielectric material.

Combs 110 and 112 are coplanar with one another, and the teeth of the two combs are interleaved. Combs 110 and 112 are not in electrical contact with one another. The spacing between the teeth changes monotonically across the length of the sensor. Thus, the spacing between tooth 111 and tooth 113 is less than that between tooth 113 and tooth 115, the spacing between tooth 113 and tooth 115 is less than that between tooth 115 and tooth 117, and the spacing between tooth 115 and tooth 117 is less than that between tooth 117 and tooth 119, and so on across the sensor up to tooth 123. This important aspect of the present invention enables the formation of multiple moisture traces (not shown) of different lengths between combs 110 and 112. Traces forming between points on combs 110 and 112 where adjacent teeth are further from each other will be longer than those forming between points where adjacent teeth are closer to each other. Although increased moisture levels may saturate the teeth of combs 110 and 112 that are spaced closely together, the total capacitance remains responsive to increasing moisture levels until the teeth that are separated by greater distances become saturated.

The spacing between adjacent teeth preferably changes in a manner that maximizes the linearity of the relationship between moisture level and sensor impedance. The optimal change in spacing between adjacent teeth depends on the particulate size and density of the medium in which the sensor measures moisture. A natural logarithmic (base e) change is preferred for a sensor to be used in a medium having a ratio of solids to air space of approximately 2.87. In other words, the spacing between tooth 115 and tooth 119 is 2.87 times greater than that between tooth 115 and 111. (The change in spacing shown in FIGS. 7–8 is not to scale for the purpose of clarity.)

In general, as discussed above with respect to the embodiment shown in FIGS. 4–6, a greater rate of change in distance between adjacent sensors is preferred for media having a relatively high particulate density than is preferred for media having a relatively low particulate density. Thus fine grained media (e.g., sandy and silty soils) will require wider teeth spacing of the combs than will coarse grained media (e.g., gravelly soils).

Figure 9:
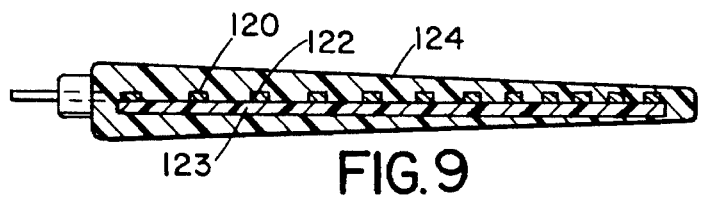
FIG. 9 is a sectional view of a sensor having interleaved comb electrodes and a dielectric casing of a thickness that varies across the electrodes.

In still another embodiment, illustrated in FIG. 9, an improved sensor has two combs 120 and 122 formed on a substrate 123. This embodiment has both combs with a changing spacing between the teeth as well as a casing 124 that varies in thickness across at least the portions of the combs that are covered by casing 124. Variation in casing thickness improves sensor linearity in the same manner as variation in tooth spacing. In this embodiment, linearization is improved by the combined effect of each method.

Figure 10:
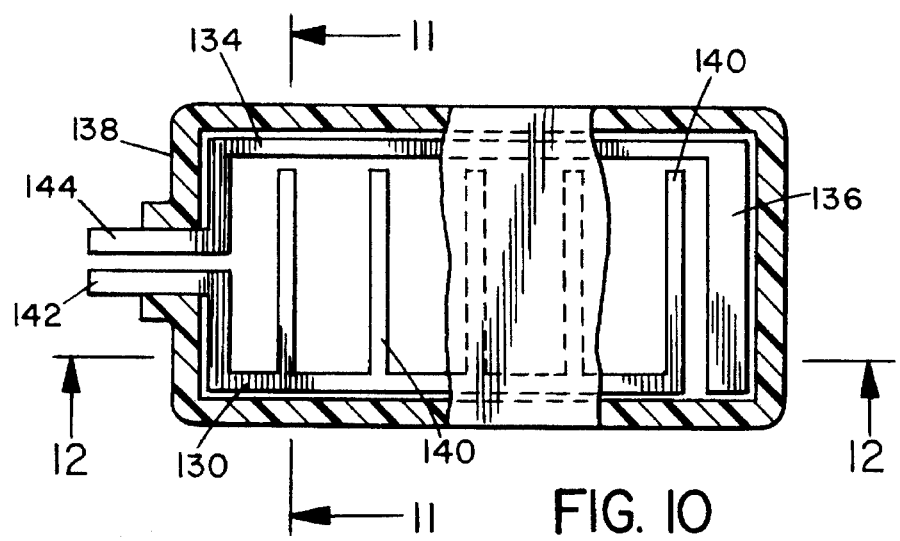
FIG. 10 illustrates a sensor having one electrode in a comb-shaped embodiment, the other electrode in a solid bar embodiment, and a dielectric casing.
Figure 11:
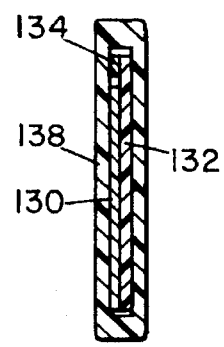
FIG. 11 is a sectional view of a sensor taken along line 11—11 of FIG. 10.
Figure 12:
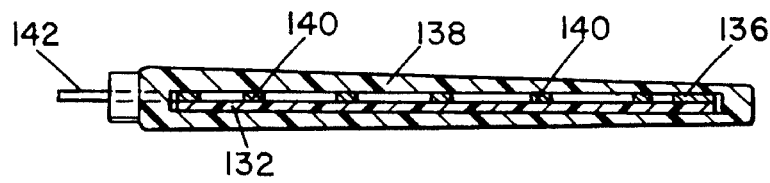
FIG. 12 is a sectional view of a sensor taken along line 12—12 of FIG. 10.

Yet another alternate embodiment of the improved sensor of the present invention is shown in FIGS. 10–12. The sensor comprises a conductive comb electrode 130 that has multiple parallel teeth or fingers 140, similar to combs 110 and 112 described above, with a dielectric substrate 132. A second electrode 134 is in the form of a metal strip without fingers 140, which terminates in a broad bar or plate 136 located at one end of the sensor. Comb electrode 130 has a terminal 142, and bar electrode 134 has a terminal 114 for connecting the sensor to a moisture measuring device such as remote unit 12. All of electrodes 130 and 134 except terminals 142 and 144 are embedded in a suitable dielectric casing 138, such as MYLAR® or a similar dielectric material.

Electrodes 130 and 134 are coplanar but are not in electrical contact with one another. The spacing between the teeth 140 of comb electrode 130 changes monotonically across the length of the sensor, as described above for combs 110 and 112, to enable the formation of multiple moisture traces (not shown) of different lengths between the teeth 140. Although increased moisture levels may saturate the teeth of comb electrode 130 that are spaced closely together, the total capacitance remains responsive to increasing moisture levels until the teeth that are separated by greater distances become saturated.

Either of the electrodes 130 or 134 may be used as the ground, although preferably the plate electrode 134 will serve that function.

Obviously, other embodiments and modifications of the present invention will occur readily to those of ordinary skill in the art in view of these teachings. Therefore, the above disclosure is to be considered exemplary only, and this invention is to be limited only by the following claims, which include all such other embodiments and modifications when viewed in conjunction with the above specification and accompanying drawings.

I claim:

1. A sensor for measuring moisture in a medium, comprising:

a first conductive plate disposed in a plane, said first plate having a first terminal;

a second conductive plate coplanar with said first conductive plate and not in contact with said first conductive plate, said second plate having a second terminal;

a casing made of a dielectric material, said first and second plates embedded in said casing with said terminals protruding from said casing, said casing having a thickness in a dimension normal to said plane; and said thickness varies across said plane.

2. The sensor described in claim 1, wherein said thickness varies in accordance with a monotonic function of distance across said plane.

3. The sensor described in claim 2, wherein:

said conductive plates have the same shape;

each said plate has an edge parallel to an axis of reflection, said edges are parallel to and separated from one another, and said plates are disposed symmetrically about said axis of reflection.

4. The sensor described in claim 3, wherein said shape is substantially rectangular.

5. The sensor described in claim 4, wherein said thickness varies across said plane in a direction parallel to said edges.

6. The sensor described in claim 5, wherein said function is logarithmic (base e).

7. The sensor described in claim 1, wherein:

said conductive plates have the same shape;

each said plate has an edge parallel to an axis of reflection, said edges are parallel to and separated from one another, and said plates are disposed symmetrically about said axis of reflection;

said thickness varies across said plane in a direction parallel to said edges; and said function is logarithmic (base e).

8. The sensor described in claim 7, wherein said shape is substantially rectangular.

9. A sensor for measuring moisture in a medium, comprising:

a first conductor having a first terminal and a plurality of parallel conductive teeth disposed in a plane;

a second conductor not in contact with said first conductor, said second conductor having a second terminal and a plurality of parallel conductive teeth coplanar with said teeth of said first conductor and interleaved with said teeth of said first conductor, each said tooth being separated from an adjacent one of said teeth by a spacing;

a casing made of a dielectric material, said conductors embedded in said casing with said terminals protruding from said casing, said casing having a thickness in a dimension normal to said plane; and said spacing between adjacent teeth varies across said plane.

10. The sensor described in claim 9, wherein said spacing varies in accordance with a monotonic function of distance across said plane.

11. The sensor described in claim 10, wherein said function is logarithmic (base e).

12. The sensor described in claim 9, wherein said thickness varies in accordance with a monotonic function of distance across said plane.

13. The sensor described in claim 12, wherein said thickness varies in a direction perpendicular to said teeth.

14. The sensor described in claim 13, wherein said function is logarithmic (base e).

15. A sensor for measuring moisture in a medium, comprising:
   a first conductor having a first terminal and a plurality of parallel conductive teeth disposed in a plane, spacing between adjacent teeth varying across said plane;
   a second conductor not in contact with said first conductor; and
   a casing made of a dielectric material, said conductors embedded in said casing with said terminals protruding from said casing, said casing having a thickness in a dimension normal to said plane.

16. The sensor described in claim 15, wherein said spacing varies in accordance with a monotonic function of distance across said plane.

17. The sensor described in claim 16, wherein said function is logarithmic (base e).

18. The sensor described in claim 15, wherein said thickness varies in accordance with a monotonic function of distance across said plane.

19. The sensor described in claim 18, wherein said thickness varies in a direction perpendicular to said teeth.

20. The sensor described in claim 19, wherein said function is logarithmic (base e).

21. A moisture monitoring system, comprising:
   a central unit for communicating with at least one remote unit, comprising:
      power supply means for providing a power signal;
      first detector means for extracting a moisture measurement signal imposed on said power signal;
      processor means for receiving said moisture measurement signal; and
   at least one remote unit disposed at a location remote from said central unit and receiving power from said power signal, comprising:
      a sensor for measuring a moisture level in a medium and for producing a moisture measurement signal corresponding to said measured moisture level; and
      remote unit modulator means for imposing said moisture measurement signal on said power signal.

22. The moisture monitoring system described in claim 21, wherein said sensor comprises:
   a pair of conductors defining a capacitance corresponding to said moisture level; and
   an oscillator circuit including said capacitance.

23. The moisture monitoring system described in claim 22, wherein:
   said power signal defines a waveform having successive zero-crossings; and
   said moisture measurement signal is imposed on said power signal during a time interval having a predetermined length immediately adjacent each said zero-crossing.

24. The moisture monitoring system described in claim 21, wherein said power signal comprises an alternating current.

25. The moisture monitoring system described in claim 21, wherein:
   said processor means produces a return signal;
   said central unit further comprises central unit modulator means for imposing said return signal on said power signal; and
   said remote unit further comprises remote unit detector means for extracting said return signal imposed on said power signal.

26. The moisture monitoring system described in claim 25, wherein said return signal imposed on said power signal is a voltage spike.

27. The moisture monitoring system described in claim 21, wherein:
   said power signal defines a waveform having successive zero-crossings;
   said moisture measurement signal is imposed on said power signal during a time interval having a predetermined length immediately adjacent each said zero-crossing; and
   said moisture measurement signal defines a square pulse.

28. The moisture monitoring system described in claim 27, wherein said square pulse has an amplitude corresponding to said measured moisture level.

29. The moisture monitoring system described in claim 28, wherein said square pulse begins at said zero-crossing.

30. The moisture monitoring system described in claim 29, wherein said square pulse has said predetermined length.

31. The moisture monitoring system described in claim 27, wherein said square pulse has a length corresponding to said measured moisture level.

32. The moisture monitoring system described in claim 31, wherein said square pulse begins at said zero-crossing.

33. A moisture control system, comprising:
   a central unit for controlling at least one valve, comprising:
      power supply means for providing a power signal;
      central unit detector means for extracting a moisture measurement signal imposed on said power signal;
      processor means for receiving said moisture measurement signal and for producing a valve control signal; and
      central unit modulator means for imposing said valve control signal on said power signal;
   at least one remote unit disposed at a location remote from said central unit and receiving power from said power signal, comprising:
      a sensor for measuring a moisture level in a medium and for producing a moisture measurement signal corresponding to said measured moisture level; and
      remote unit modulator means for imposing said moisture measurement signal on said power signal;
      remote unit detector means for extracting said valve control signal imposed on said power signal; and
   a valve controller for controlling water flow in response to said valve control signal.

34. The moisture control system described in claim 33, wherein said sensor comprises:
   a pair of conductors defining a capacitance corresponding to said moisture level; and
   an oscillator circuit including said capacitance.

35. The moisture control system described in claim 33, wherein said power signal comprises an alternating current.

36. The moisture control system described in claim 34, wherein:

said power signal defines a waveform having successive zero-crossings; and said moisture measurement signal and said valve control signal are imposed on said power signal during a time interval having a predetermined length immediately adjacent each said zero-crossing.

37. The moisture control system described in claim 36, wherein said predetermined length is approximately 200 microseconds.

38. The moisture control system described in claim 36, wherein said valve control signal imposed on said power signal is a voltage spike.

39. The moisture control system described in claim 36, wherein said moisture measurement signal defines a square pulse.

40. The moisture control system described in claim 39, wherein said square pulse has an amplitude corresponding to said measured moisture level.

41. The moisture control system described in claim 40, wherein said square pulse begins at said zero-crossing.

42. The moisture control system described in claim 41, wherein said square pulse has said predetermined length.

43. The moisture control system described in claim 39, wherein said square pulse has a length corresponding to said measured moisture level.

44. The moisture control system described in claim 43, wherein said square pulse begins at said zero-crossing.

* * * * *